J. B. LEGG.
Cotton-Seed Planter and Fertilizer-Distributor.
No. 160,920. Patented March 16, 1875.
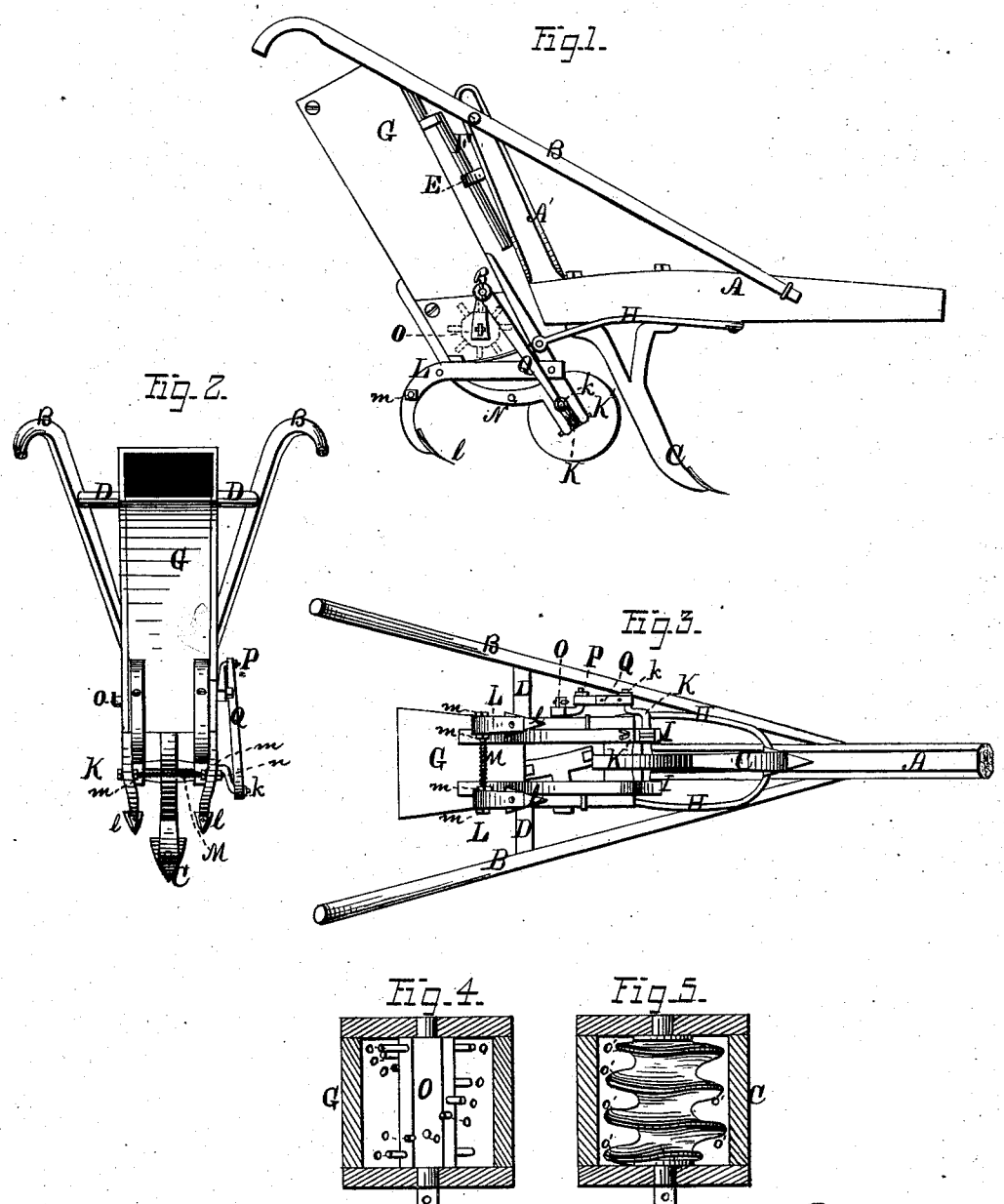

UNITED STATES PATENT OFFICE.

JOHN B. LEGG, OF ROME, GEORGIA.

IMPROVEMENT IN COTTON-SEED PLANTERS AND FERTILIZER-DISTRIBUTERS.

Specification forming part of Letters Patent No. 160,920, dated March 16, 1875; application filed October 12, 1874.

*To all whom it may concern:*

Be it known that I, JOHN B. LEGG, of Rome, in the county of Floyd and in the State of Georgia, have invented certain new and useful Improvements in Cotton-Seed Planters and Fertilizer-Distributers; and do hereby declare that the following is a full, clear, and exact description thereof, reference being had to the accompanying drawings making a part of this specification, in which—

Figure 1 is a side elevation of my improved device as arranged for use. Fig. 2 is an elevation of the rear end of the same. Fig. 3 is a plan view of the lower side of said device, and Figs. 4 and 5 are horizontal sections of the hopper, showing two forms of clearer.

Letters of like name and kind refer to like parts in each of the figures.

This invention relates to that class of cotton-seed planters, in which the furrowing-plow and the seed-box with its adjuncts are flexibly connected, so that they can move independently within certain limits, and in which a wheel or roller is employed to pack the bottom of the furrow after the plow has opened it, and before the seed is dropped into it; and my improvement consists principally in the novel means employed for flexibly connecting the seed-box to the furrowing-plow, substantially as and for the purpose hereinafter specified. It consists further in so combining the seed-box and suitable stops with the covering-plows as to control their vertical movements, substantially as and for the purpose hereinafter set forth.

In the annexed drawings, A represents a plow-beam provided with handles B and B, and having the usual form of shovel-plow C attached to or upon its lower side and rear end. From the rear end and upper side of the beam A a standard, A', extends vertically upward, and at its upper end is connected to or with a rung, D, which extends between the handles B and B. An eye, E, attached to the rear side of the standard A', receives a guide-rod, F, which is attached to or upon the front side of an ordinary seed-box or hopper, G, and serves to connect the upper end of the latter to or with the plow, and at the same time permit a certain degree of independent vertical motion.

The lower end of said seed-box G is connected with the plow-beam A by means of two curved bars, H and H, which are each pivoted at one end to or upon the front side of said box, and at their opposite ends upon the lower side near the longitudinal center of said plow-beam, such arrangement permitting said seed-box and plow to move independently within certain limits, in vertical and lateral directions. Journaled within suitable bearings I and I, that are attached to the lower end of the seed-box G, is a shaft, K, upon which is secured a wheel, K', for forming a channel for the reception of the seed. The bearings or hangers I I are curved forward so as to hold the wheel K' a proper distance in advance of the hopper-throat to let the seed fall behind the said wheel or roller. Upon the outer side of each bearing I is pivoted one end of a beam, L, which from thence extends rearward, downward, and then forward, and has attached to its rear end a shovel or covering plow, *l*. A rod, M, passes horizontally through the rear portions of said beams, and is provided upon its threaded ends with nuts *m m*, by means of which said rod can be shortened or lengthened, so as to diminish or increase the distance between said plows. A stop, N, secured within the rear portion of each bearing I, prevents the plow-beams L and L from passing below a certain point, while their upward motion is limited by the bottom of the seed-box G. The lower end of the seed-box G is provided with the usual opening for the passage of seed, which opening is controlled by means of a slide, in the ordinary manner. In order that seed may be prevented from clogging at the lower end of the seed-box G, a shaft, O, is journaled horizontally within the same at a point somewhat above its bottom, and upon its inner portion is provided a series of radial arms, *o* and *o*, which are arranged in a spiral form around said shaft. Upon one end of the shaft O, outside of the box G, is secured a crank-arm, P, which is connected by means of a rod, Q, with a crank, *k*, that is attached to the corresponding end of the shaft K, the arrangement being such as to cause a rotary motion of said shaft K to communicate a semi-rotary motion in opposite directions to said shaft O, the said motion of the latter causing the arms *o* and *o* to pass over the discharge-opening of the seed-box, and clear the same of any obstruction.

For use in the planting of rolled seed, or the distribution of dry fertilizers, I prefer the clearer shown in Fig. 5, which consists in a complete spiral thread, *o'*, in place of the arms *o* and *o*, said thread operating to free the discharge opening from obstructions, and also to insure a regular discharge of the seed.

The device thus constructed, is used in the ordinary manner, the plow partially forming the furrow, which is completed by the wheel, while the seed from the hopper is dropped into such furrow, and then covered by the rear plows.

I do not claim, broadly, the use of a supporting-wheel connected to the hopper, but only the employment of said wheel when arranged in a line with the furrowing-plow, and enabled to perform the twofold functions shown.

Having thus fully set forth the nature and merits of my invention, what I claim as new, is—

1. The means employed for connecting together the seed-planting devices and the plow, consisting of the eye E, guide-rod F, and the curved bars H and H, said parts being constructed and combined in the manner and for the purpose substantially as specified.

2. The covering-plows L L, in combination with the seed-box G, and stops N, substantially as and for the purpose set forth.

In testimony that I claim the foregoing, I have hereunto set my hand this 29th day of September, 1874.

JOHN B. LEGG.

Witnesses:
T. F. SMITH,
JNO. J. WHITEHEAD.